Aug. 28, 1962     A. W. CULP, JR     3,051,838
NEUTRON PYROMETER
Filed April 25, 1960                     2 Sheets-Sheet 1
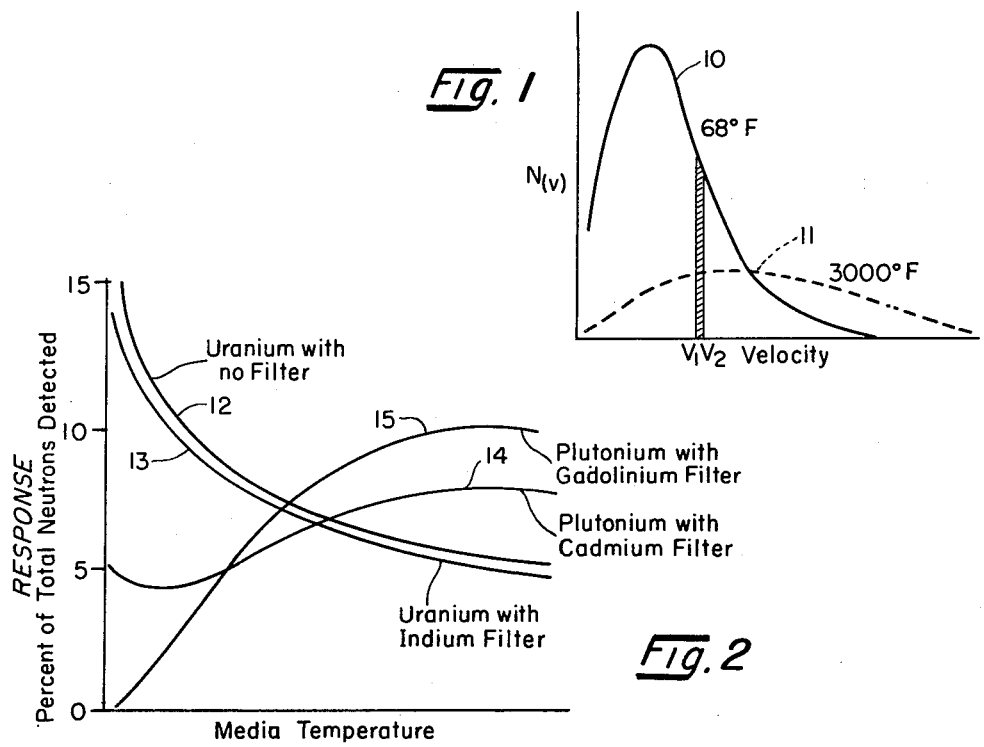
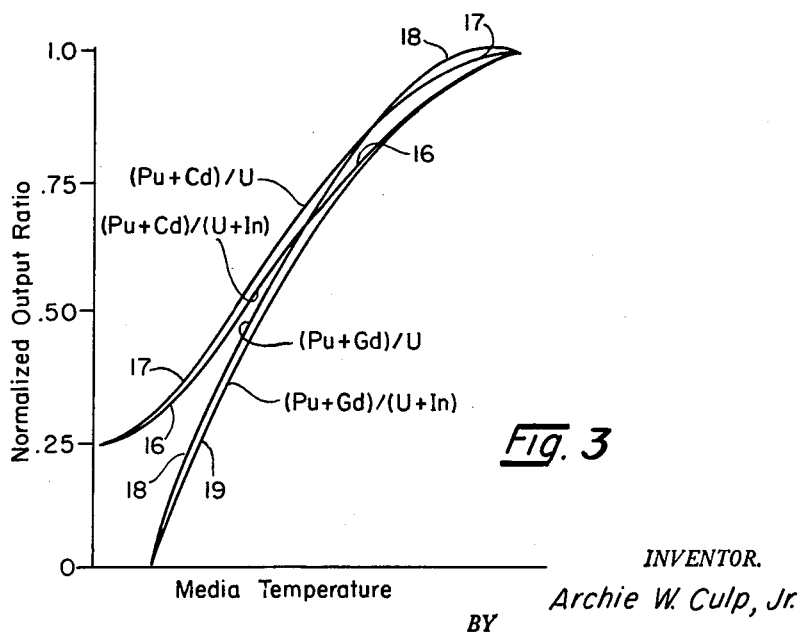
INVENTOR.
Archie W. Culp, Jr.
BY
ATTORNEY Aug. 28, 1962     A. W. CULP, JR     3,051,838
NEUTRON PYROMETER
Filed April 25, 1960     2 Sheets-Sheet 2
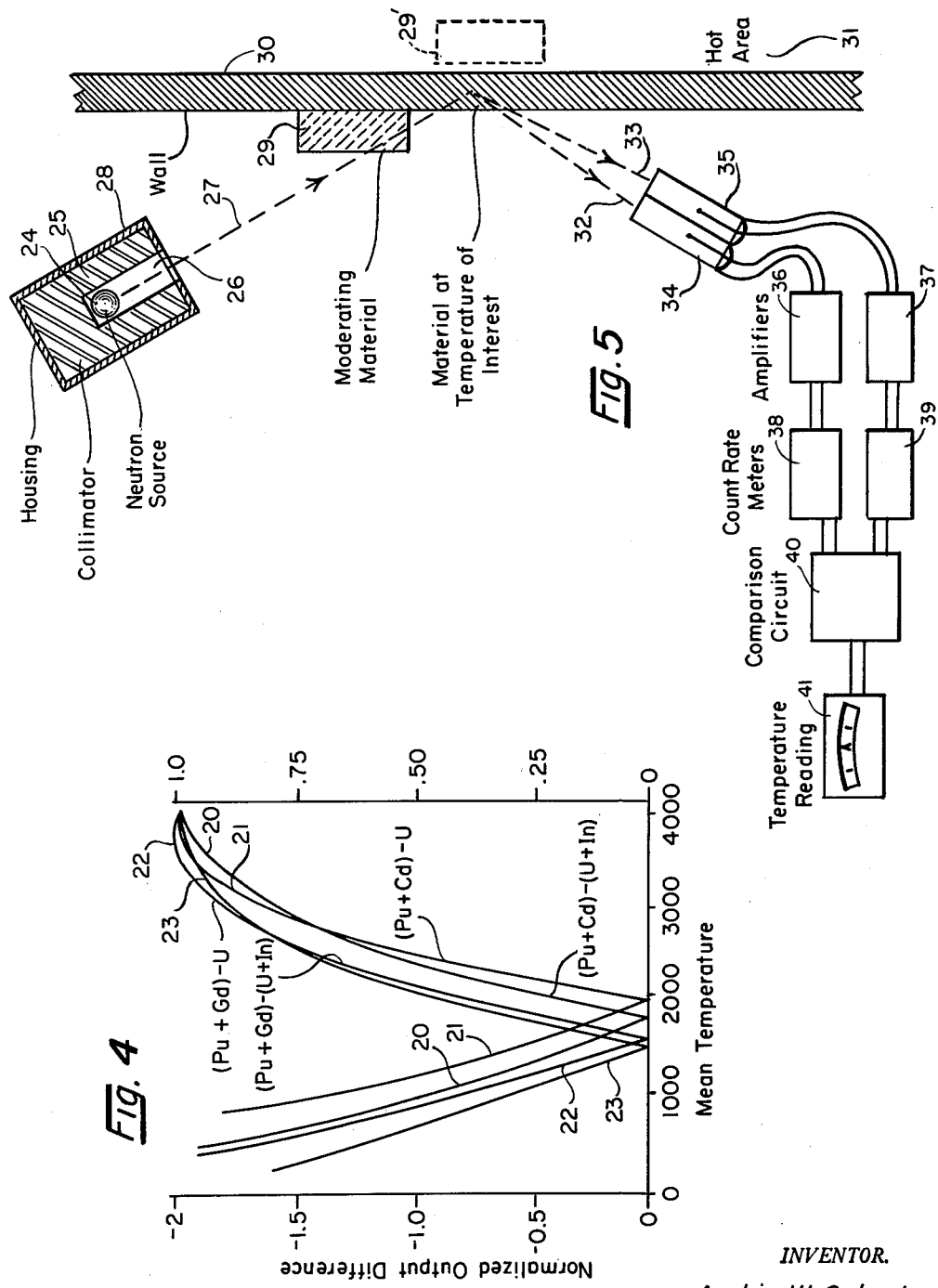
INVENTOR.
Archie W. Culp, Jr.
BY
B. B. Olive
ATTORNEY United States Patent Office 3,051,838
Patented Aug. 28, 1962

3,051,838
NEUTRON PYROMETER
Archie W. Culp, Jr., Raleigh, N.C., assignor to Astra, Inc., Raleigh, N.C., a corporation of North Carolina
Filed Apr. 25, 1960, Ser. No. 24,538
6 Claims. (Cl. 250—83.1)

This invention relates to pyrometers and more specifically to a novel method and apparatus for measuring temperature by bombarding a heated area with neutrons and using the reflected neutron distribution as a means of indicating the temperature of the area.

With the advent of modern space transportation and advances in materials engineering, greater demand is being made for temperature measuring devices capable of measuring extremely high temperatures in unusual environments. Conventional temperature sensing devices are in many cases inherently incapable of measuring extremely high temperatures and in other cases are unreliable and of short life when placed in a high temperature environment. Another limitation frequently found with conventional temperature sensing devices is the inability to measure high temperatures in relatively inaccessible areas. The present invention has therefore, as an object, the provision of a novel pyrometric method and apparatus adaptable to high and unusual temperature environments.

In the art of radiation-type pyrometers, recognition has been given to a basic principle of instrumentation which states that for certain radiated energy distributions related to temperature, two sensors having different radiated energy detecting characteristics are sufficient to define the distribution and thus the temperature. Applications of this principle may be found in the pyrometers disclosed in United States Letters Patent 2,302,554 to Edwin F. Kingsbury, United States Letters Patent 2,695,364 to Ralph A. Wolfe, and United States Letters Patent 2,912,862 to Raymond C. Machler et al. It will be noted that the devices described in these patents operate on the theory of detecting energy that is inherently radiated from a hot body by means of placing two radiant energy sensitive sensors of different response characteristic in the path of the radiated energy and using either the ratio or the difference of the output of the sensors as a means of indicating temperature. In the Kingsbury patent, for example, a beam of the radiated energy from a hot source is divided so as to be directed partly on one photo-electric sensor having maximum response at one wavelength and partly on a second photo-electric sensor having maximum response at another wave length. The sensor's outputs are differentially connected and the relative response indicates temperature. A common feature of these prior art pyrometers is that the basic principle referred to is applied by measuring energy which is naturally or inherently radiated from a hot source. In contrast, the present invention applies the basic principle to a thermal neutron distribution and measures temperature by measuring an artificially induced radiated energy, namely, a thermal neutron distribution related to the temperature being measured.

Advantage has been taken in the present invention of the mentioned principle and of certain phenomena associated with neutrons. One such phenomenom is that when high energy neutrons are slowed down through an essentially non-absorbing media, they are elastically and inelastically scattered by the atoms and molecules of the media. Each collision reduces the energy of the neutron and the process continues as to those neutrons that do not escape until the neutron energy is approximately the same as that of the atoms of the media and in a range of energies about the thermal energy. The energy spectrum of such thermal neutrons approximates a socalled Maxwellian distribution and the number of collisions required to achieve such a distribution is a function of the initial energy of the neutron and the atomic mass of the subject media.

Since the mean velocity of the atoms or molecules in the subject media is proportional to the square root of the absolute temperature, any change in temperature of the media corresponds to a change in velocity of the atoms or molecules. Accordingly, the Maxwellian average temperature of any neutrons engaged in slowing down through the media will change the same amount and with high neutron velocity, any change in the media temperature will cause an almost identical change of the thermal neutron average temperature, this sometimes being referred to as neutron temperature. Thus, when neutrons traverse a moderating media of given temperature, the neutrons may attain an average energy proportional to the temperature of the media.

An associated phenomenom of interest is that with many materials, when the material is bombarded with a flux of fast neutrons and the neutrons are reduced to thermal energies, the slow or thermal neutrons produced by the bombardment are subject to deflection and scattering. For this reason, there can be a relatively constant flow of fast neutrons into a material simultaneously with a relatively constant flow of thermal neutrons out of the material in various directions and the average energy of such thermal neutrons is proportional to the temperature of the media. In one aspect of the invention there is recognition of the possibility of determining a media temperature by defining a thermal neutron energy distribution emitted by the media.

A further phenomenom is that while neutrons in themselves contain no charge they may nevertheless be detected. One such detection device is the fission chamber which operates on the principle of interaction between neutrons and materials in the chamber so as to produce charges that can be detected. A characteristic of the fission chamber is that the rate of interaction between neutrons and the materials of the chamber depends upon the nature of the materials and the energy of the neutron. For a given material at a constant temperature, the probability of interaction is a function only of the neutron energy. Therefore, by carefully selecting the fission chamber materials, it is possible to design fission chambers having entirely different rates of interaction to the same neutron energy distribution. One fission chamber may, for example, have its highest response or count rate to a particular neutron energy in the distribution whereas the other fission chamber may have its highest response to an entirely different neutron energy in the distribution. As the distribution changes, each fission chamber response undergoes a change and the character of the change can be designed to be different with each chamber.

In accordance with the invention, advantage is taken of the above phenomena and the basic principle referred to by providing a neutron source which bombards with neutrons a media whose temperature is controlled by the temperature of the environment being measured. The media which in some cases may be the hot source itself, is chosen so as to have the characteristics of bringing the neutrons to a thermal range of energies corresponding to the temperature in question and reflecting such thermal neutrons from the media. A stream of the reflected thermal neutrons is directed partly at one neutron sensor and partly at another neutron sensor, the two sensors being designed so as to have a different response to the distribution of the reflected thermal neutron energy. Since the neutron energy distribution is determined by and, in effect, represents the temperature of the media, the sensors, in effect, vary with the absolute temperature being measured but in different amount. For example, the response of one sensor may be designed to vary directly with the absolute temperature and the other sensor may be designed to vary inversely with the absolute temperature. In association with the mentioned neutron source, media and pair of sensors is the necessary circuitry for amplifying the sensor responses, comparing the two responses and converting the relative response, which may be either a ratio or difference, to a temperature indication. The basic principle is thus applied in the present invention by inducing an artificial source of radiation from the temperature environment in the form of a reflected thermal neutron energy distribution that is dependent on the absolute temperature of the environment and by defining the distribution with a pair of neutron sensitive sensors of different response to the distribution.

The accompanying drawings and descriptions are referred to for an explanation of the invention in more detail. In the drawing, FIGURE 1 represents typical Maxwellian thermal neutron distributions at 68 degrees Fahrenheit and 3000 degrees Fahrenheit.

FIGURE 2 shows the calculated response variation of various fission chamber elements with media temperature.

FIGURE 3 shows the variation of the ratio of the response from various pairs of sensors of different response.

FIGURE 4 shows the variation of the difference of the responses from various pairs of sensors of different response.

FIGURE 5 schematically represents an apparatus and system embodying the invention.

Referring to FIGURE 1, there are shown typical curves 10 and 11 of the Maxwellian thermal neutron energy distribution at 68 degrees Fahrenheit and at 3000 degrees Fahrenheit respectively. Neutron speed in appropriate units such as meters per second is plotted against the fraction of particles in a unit range of speed such as the increment between V-1 and V-2 of curve 10. From these curves can be seen the relation of neutron energy distribution and temperature and also the fact that a particular temperature is related to a particular distribution. Thus, when the distribution is defined the temperature is determined.

In FIGURE 2, there are plotted calculated curves 12, 13, 14, and 15 representing response of various fission chamber elements to media temperature which is, in effect, what we have referred to as neutron temperature. These curves were obtained by taking assumed Maxwellian distributions at many temperature points. With a given filter, the attenuation of the spectrum in terms of energy was determined and this attenuated spectrum was imposed on a thin layer of fissionable chamber material. Curve 12 represents the response of a one mil thick uranium 239 fission chamber having no filter and curve 13 represents the response of the same fission chamber but with an indium filter four mils thick. The variation of the fraction of the total detected neutrons incident on the two types of uranium 235 fission chamber with temperature is shown. Curves 14 and 15 represent similar variations with a one mil thick plutonium 239 fission chamber equipped for purposes of curve 14 with a two mil thick cadmium filter and for purposes of curve 15 with a two mil thick gadolinium filter. Special note should be taken of the fact that the uranium chamber response decreases with increasing temperature while the plutonium chamber response increases with increasing temperature.

Recognizing that the response of a pair of fission chamber detectors to a given neutron energy distribution can be designed to be quite different as illustrated by curves 12 through 15, it has been found that a greater variation can be obtained by combining the output of two such detectors of different response and obtaining the relative response which may be either a ratio or difference. The variation of the ratios of the detectors is shown in FIGURE 3 and the variation of the differences of the detectors, which is found to give an even greater response, is shown in FIGURE 4. In FIGURE 3, curve 16 represents the response of the ratio of the plutonium-cadmium detector of curve 14 to the uranium-indium detector of curve 13. Curve 17 represents the response of the ratio of the plutonium-cadmium detector of curve 14 to the uranium detector of curve 12. Curve 18 represents the response of the ratio of the plutonium-gadolinium detector of curve 15 to the uranium detector of curve 12 and curve 19 represents the response of the ratio of the plutonium-gadolinium detector of curve 15 to the uranium-indium detector of curve 13.

In FIGURE 4, the calculated result of comparing differences rather than ratios is illustrated. Curve 20 represents the response of the difference between the plutonium-cadmium detector of curve 14 and the uranium-indium detector of curve 13. Curve 21 represents the response of the difference between the plutonium-cadmium detector of curve 14 and the uranium detector of curve 12. Curve 22 represents the response of the difference between the plutonium-gadolinium detector of curve 15 and the uranium detector of curve 12. Curve 23 represents the response of the difference between the plutonium-gladolinium detector of curve 15 and the uranium-indium detector of curve 13. In order to show all of the curves of FIGURE 4 above the X-ordinate, the left hand portions of the curves use the vertical negative scale on the left and the right hand portions of the curves use the vertical positive scale shown on the right.

In connection with FIGURE 4, it is noted that a null point occurs in the different curves where the responses of the detectors are equal. This null point can be changed by changing the filter thicknesses. The gradient of the response curve near the null position is quite steep and this is of particular advantage where small temperature variations are desired to be measured. For example, for curve 21 (plutonium-cadmium minus uranium) the null point is at 1950 degrees Fahrenheit and there is a response magnitude variation of forty three percent between 2000 degrees Fahrenheit and 2020 degrees Fahrenheit.

Apparatus embodying the method of the invention and the referred to phenomena and basic principle is schematically illustrated in FIGURE 5. In this figure there is shown in schematic cross section a so-called "howitzer" in which 24 represents a suitable neutron source which should preferably yield relatively low energy neutrons so as to reduce the length of moderator required to slow the neutrons down to thermal energy. A suitable source is the radioactive reaction which uses antimony and beryllium. Radium beryllium, polonium-beryllium or charge particles neutron sources could also be employed. Surrounding neutron source 24 is a collimator 25 which may be paraffin for relatively low temperature locations of the source or berylliumoxide for relatively high temperature locations of the source. Collimator 25 assists in directing a beam of neutrons through hole 26 along line 27. Surrounding collimator 25 is a suitable housing and shielding represented at 28 which for relatively low temperature locations of the howitzer may be Boral, an aluminum-boron-carbide mixture or for high temperature locations of the howitzer, may be a stainless steel clad-Europia steel matrix. In the line of neutron flow along line 27, the neutrons strike a moderator block 29 which is exposed to and is at the temperature of interest such as the temperature of a structural wall 30 adjacent a heated environment 31, the wall being at a temperature less than its boiling point. Construction wall 30 may, for example, be a rocket wall surrounding a chamber of burning fuel of very high temperature and moderator block 29 could actually be made a part of the wall itself or be located at the position indicated by dotted lines at 29'. Moderator block 29 should preferably be composed of a material that has a relatively large slowing down power for neutrons; it should have a low absorption cross section; it should have reasonably good conducting properties, and it should be able to withstand high temperatures, preferably in an oxidizing atmosphere. Various carbides, graphite and beryllium-oxide are suitable and in order to reduce the thermal lag time, the block may contain various cooling passages, not shown. The neutrons, as previously described, achieve a thermal range of energies corresponding to the absolute temperature of block 29 and after being scattered will in part be directed in various directions such as along lines 32 and 33.

In the path of neutrons scattered along line 32 is placed a neutron sensor 34 having, for example, a neutron response corresponding to curve 14 and in the path of neutrons scattered along line 33 is placed a neutron sensor 35 having, for example, a neutron response corresponding to curve 12. As previously mentioned, neutron sensors 34 and 35 must meet the basic requirements of being sensitive to neutron temperature, of yielding charged particles resulting in ionization that can be measured and additionally, each sensor is required to produce a response different from the other. The fission chamber materials described in connection with curves 12 through 15 meet these requirements.

In order to utilize the output of the sensors, 34, 35 there are employed amplifiers 36, 37 which may be of conventional design and which serve to amplify the count rates of sensors 34, 35. Count rate meters 38, 39 are fed by amplifiers 36, 37 and serve to convert the count rate to two measurable voltages corresponding to the particular count rates or sensor response. The model 10509 uranium-235 fission chamber and the model 20403 count-rate meter manufactured by the Radiation Counter Laboratories, Inc., of 5122 West Grove Street, Skokie, Illinois, exemplify the type apparatus adaptable to the invention. Comparison circuit 40, which may utilize various forms of well known electronic ratio or difference circuitry, receives the two voltages and produces a single voltage representing the relative response, either as a ratio or difference of the two voltages but preferably as a difference, and conventional voltage sensitive instrument 41 converts the electrical voltage thereby produced to a visual indication calibrated to represent the temperature of interest.

To summarize the embodiment of the invention described in the drawings, it is desired to know the temperature of a representative heated environment 31, surrounded by a representative structural wall 30 which is presumed to be at or near the same temperature as the temperature of environment 31. A suitable neutron moderating block 29 is placed adjacent wall 30 so as to assume the same temperature. Under these conditions, a beam of neutrons from source 24 and collimated by collimator 25 is directed at block 29 where the neutrons assume an approximate Maxwellian thermal energy distribution as illustrated by curves 10 and 11 and after leaving block 29 the thermal neutrons are scattered by wall 30 in various directions. Those scattered thermal neutrons moving along lines 32 and 33 are directed into fission chambers 34 and 35 respectively, where the interaction between these thermal neutrons and the material of the chambers results in output responses of different amounts as determined by the chamber materials employed and the temperature of block 29, such relation being illustrated by curves 12 through 15. The two fission chamber responses are separately amplified by amplifiers 36, 37, converted to corresponding voltages by count rate meters 38, 39 and compared as to their difference by comparison circuit 40 which produces a single electrical signal, such as a voltage representing this difference and also the desired temperature as illustrated by curves 20 through 23. This final signal is then fed to instrument 41 which converts the signal to an actual temperature reading calibrated to represent the absolute temperature of environment 31, the temperature in question It will be seen that many advantages arise from the apparatus and method described. One principal advantage is that of being able to accurately measure extremely high temperatures in the order of 4000 degrees Fahrenheit and above. Another advantage is that since the source and sensors may be remotely located, relatively inaccessible areas may be penetrated by the beam of relatively fast neutrons and the resulting beam of scattered thermal neutrons read from a distance. The invention also makes it possible to measure from one side of a sheet of material impervious to light rays the temperature of materials residing on the other side of the impervious sheet. Another advantage is demonstrated by the fact that when detecting radiations that are inherently radiated from a hot body, it is frequently necessary to filter out certain natural radiations in order to obtain accurate measurements. However, in the present invention since the measured radiation is an artificially induced and controllable neutron radiation filtering out of extraneous natural radiation is made unnecessary.

Various modifications are are apparent. Certain structural material may, for example, inherently possess the desired moderating characteristics in which cases the measured temperature would be that of the material itself rather than of a moderating block placed adjacent to the material and at the same temperature. It should also be understood that since neutron scattering may result in thermal neutrons going in all directions, the sensors may be located at positions other than those shown so long as the sensors are at a position where the thermal neutron energy distribution exists in sufficient strength to be detected. If desired, the sensors may also be associated with a conventional recording device for recording the temperature. In certain systems employing a radio-active source such as for measuring density thickness or other characteristics and in certain areas of nuclear reaction, the system itself may inherently employ a neurton source as an operational component and which has operational characteristics suitable to the present invention. Where a system inherently employs such a neutron source and there is a temperature to be measured and the necessary Maxwellian thermal energy distribution related to such temperature is obtainable through such source, it is contemplated that the dual sensor measuring arangement of this invention could be applied to obtain measurement of such temperature.

Having described my invention, I claim:

1. A neutron radiation pyrometer for measuring temperature of a given media comprising a source of neutrons, means to direct a beam of said neutrons at said media, means to bring said beam of neutrons to a thermal neutron distribution corresponding to said temperature, a pair of neurton sensors so located as to capture said thermal neutrons and produce electrical responses related to the energy of said thermal neutrons, said sensors being of different neutron energy response, means to amplify and obtain the relative response of said sensors, the magnitude of said relative response being an indication of said temperature.

2. A neutron radiation pyrometer for measuring temperature comprising a neutron emitting source, a substantially non-absorbing neutron moderator in the path of neutrons emitted by said source and residing at said temperature, said moderator acting to bring said neutrons to a substantially thermal energy distribution corresponding to said temperature, a pair of neutron energy sensors of different neutron energy response and so located as to detect reflected neutrons that have assumed said distribution and electrical means for indicating the relative response of said sensors as an indication of said temperature.

3. A neutron radiation pyrometer for measuring temperature of a given media comprising a neutron emitting source, a substantially non-absorbing neutron moderating means located in the path of neutrons emitted by said source and in thermal relation with said media, said neutrons thereby being brought to a thermal range of energies dependent on said temperature, a pair of neutron sensors of different neutron energy response and so located as to detect neutrons that have achieved said thermal range of energies and electrical means of indicating the relative response of said sensors as an indication of said temperature.

4. A neutron radiation pyrometer comprising a source of neutrons so located with reference to a media having a temperature to be measured as to cause the neutrons to strike the media, said media having the characteristic of bringing said neutrons to a thermal range of energies corresponding to said temperature, a pair of neutron sensors having opposite temperature response characteristics and so located as to detect neutrons having said thermal range of energies and electrical means of indicating the relative response of said sensors as an indication of said temperature.

5. A neutron radiation pyrometer for measuring temperature comprising a pair of neutron energy sensors, means for causing said sensors when exposed to a given thermal neutron energy distribution to have electrical responses of different intensity, a neutron emitting source, means to bring neutrons from said source to a thermal neutron energy distribution corresponding to said temperature, said sensors being located to as to be exposed to said thermal energy distribution and electrical means for indicating the relative response of said sensors as an indication of said temperature.

6. A system for measuring temperature of a media having the inherent ability to bring neutrons striking the media to a thermal range of energies corresponding to said temperature and to reflect the thermal neutrons thereby produced comprising a source of neutrons, means to direct a neutron beam from said source at said media, a pair of neutron sensors so located as to be exposed to said reflected thermal neutrons, said sensors having the characteristic of producing electrical outputs of different intensity when so exposed and means for obtaining the relative electrical output of said sensors, said relative output being related to said temperature.

References Cited in the file of this patent

A Survey of Neutron Thermalization Theory, by Cohen, International Conference on Peaceful Uses of Atomic Energy, United Nations Publication, New York, 1956, vol. 5, pages 405 to 415.

UNITED STATES PATENT OFFICE
CERTIFICATE OF CORRECTION

Patent No. 3,051,838                      August 28, 1962

Archie W. Culp, Jr.

It is hereby certified that error appears in the above numbered patent requiring correction and that the said Letters Patent should read as corrected below.

Column 6, line 5, after "question" insert a period; line 26, strike out "are", first occurrence; same column 6, line 43, for "neurton" read -- neutron --; column 8, line 6, for "to", first occurrence, read -- so --.

Signed and sealed this 18th day of December 1962.

(SEAL)
Attest:

ERNEST W. SWIDER
Attesting Officer

DAVID L. LADD
Commissioner of Patents